(12) United States Patent
Yacoub

(10) Patent No.: US 9,145,822 B2
(45) Date of Patent: Sep. 29, 2015

(54) METHOD AND DEVICE FOR CONTROLLING A FOUR-STROKE INTERNAL COMBUSTION ENGINE

(71) Applicant: Ford Global Technologies, LLC, Dearborn, MI (US)

(72) Inventor: Yasser Mohamed sayed Yacoub, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 298 days.

(21) Appl. No.: 13/932,737

(22) Filed: Jul. 1, 2013

(65) Prior Publication Data

US 2014/0014062 A1 Jan. 16, 2014

(30) Foreign Application Priority Data

Jul. 16, 2012 (DE) .......................... 10 2012 212 405

(51) Int. Cl.
| | |
|---|---|
| F02D 13/06 | (2006.01) |
| F02M 25/07 | (2006.01) |
| F02B 47/08 | (2006.01) |
| F02B 17/00 | (2006.01) |
| F02D 13/02 | (2006.01) |
| F02D 41/00 | (2006.01) |
| F02D 41/30 | (2006.01) |
| F02D 41/40 | (2006.01) |
| F02D 41/38 | (2006.01) |
| F02P 5/04 | (2006.01) |
| F02P 9/00 | (2006.01) |

(52) U.S. Cl.
CPC .......... *F02B 17/005* (2013.01); *F02D 13/0257* (2013.01); *F02D 13/06* (2013.01); *F02D 41/0087* (2013.01); *F02D 41/3017* (2013.01); *F02D 41/402* (2013.01); *F02D 2041/001* (2013.01); *F02D 2041/389* (2013.01); *F02D 2200/602* (2013.01); *F02P 5/045* (2013.01); *F02P 9/002* (2013.01); *Y02T 10/18* (2013.01); *Y02T 10/44* (2013.01)

(58) Field of Classification Search
CPC . F02D 41/0087; F02D 13/06; F02D 13/0257; F02D 17/02; F02M 25/0752; F02M 25/0749; F02M 25/0723; F02M 25/0743
USPC .................. 123/90.15, 436, 481, 492, 198 F, 123/345–348, 568.13, 568.14, 58.8
See application file for complete search history.

(56) References Cited

U.S. PATENT DOCUMENTS

| | | | |
|---|---|---|---|
| 5,228,422 A | 7/1993 | Wakeman | |
| 7,219,634 B2 * | 5/2007 | Hitomi et al. | ................ 123/58.8 |

(Continued)

FOREIGN PATENT DOCUMENTS

| | | |
|---|---|---|
| DE | 10320845 A1 | 11/2004 |
| EP | 0473258 A2 | 6/1991 |

*Primary Examiner* — Hai Huynh
(74) *Attorney, Agent, or Firm* — Julia Voutyras; Alleman Hall McCoy Russell & Tuttle LLP

(57) ABSTRACT

A system is disclosed for a four-stroke internal combustion engine comprising: at least two cylinders; a fuel direct injection device; a variable valve timing system; an engine controller to control valve timing according to load; wherein, below a lower load threshold, a first cylinder is deactivated, an injection of fuel takes place into a combustion chamber of the first cylinder and an inlet valve of the first cylinder is open during a compression stroke. The opening of the inlet valve during a compression stroke of the first cylinder when deactivated allows the substantially homogenous air-fuel mixture therein to escape into the intake manifold and be made available to the second and active cylinder.

20 Claims, 5 Drawing Sheets

(56) References Cited

U.S. PATENT DOCUMENTS

| | | |
|---|---|---|
| 7,278,492 B2 | 10/2007 | Braddick |
| 8,944,026 B2 * | 2/2015 | Tobergte et al. ............... 123/294 |
| 2005/0011485 A1 | 1/2005 | Ryan, III et al. |
| 2014/0014066 A1 * | 1/2014 | Yacoub .................... 123/406.23 |

* cited by examiner

| | Cylinder 1 | | | Cylinder 2 | | | Cylinder 3 | | | Cylinder 4 | | |
|---|---|---|---|---|---|---|---|---|---|---|---|---|
| stroke | Inlet valve | Outlet valve | stroke | Inlet valve | Outlet | stroke | Inlet valve | Outlet | stroke | Inlet valve | Outlet |
| intake | open | closed | exhaust | closed | open | expansion | closed | closed | compression | closed | closed |
| compression | open | closed | intake | open | closed | exhaust | closed | open | expansion | closed | closed |
| expansion | closed | closed | compression | closed | closed | intake | open | closed | exhaust | closed | open |
| exhaust | closed | open | expansion | closed | closed | compression | open | closed | intake | open | closed |

| | Cylinder 1 | | | | Cylinder 2 | | | | Cylinder 3 | | | | Cylinder 4 | | |
|---|---|---|---|---|---|---|---|---|---|---|---|---|---|---|---|
| stroke | Pre | Main | Post | stroke | Pre | Main | Post | stroke | Pre | Main | Post | stroke | Pre | Main | Post |
| intake | - | - | - | exhaust | - | - | - | expansion | - | - | + | compression | + | + | - |
| compression | + | + | - | intake | - | - | - | exhaust | - | - | - | expansion | - | - | + |
| expansion | - | - | + | compression | + | + | - | intake | - | - | - | exhaust | - | - | - |
| exhaust | - | - | - | expansion | - | - | + | compression | + | + | - | intake | - | - | - |

FIG. 4

METHOD AND DEVICE FOR CONTROLLING A FOUR-STROKE INTERNAL COMBUSTION ENGINE

CROSS REFERENCE TO RELATED APPLICATIONS

The present application claims priority to German Patent Application No. 102012212405.5, filed on Jul. 16, 2012, the entire contents of which are hereby incorporated by reference for all purposes.

TECHNICAL FIELD

The application relates to a method and a device for controlling a four-stroke internal combustion engine.

BACKGROUND AND SUMMARY

Internal combustion engines, in particular internal combustion engines that are used in motor vehicles may be equipped with a fuel injection system. In particular in the case of gasoline injection for applied-ignition engines, a distinction is made between intake pipe injection (also referred to as port injection), in which the injection valve is situated in the intake pipe upstream of an inlet valve of the respective cylinder, and direct injection, in which the fuel is injected directly into the cylinder. Intake pipe injection permits simple production of a homogeneous fuel-air mixture which is introduced into the combustion chamber of the cylinder.

Direct injection may permit different forms of combustion. Firstly, it is possible for a stratified charge to be produced in the combustion chamber of the cylinder, whereby the engine may, in the part-load range, be operated with high efficiency with a "lean" mixture. Secondly, it is also possible for a homogeneous fuel-air mixture to be produced in the combustion chamber, which may be optimal in the full-load range. To permit both combustion with a stratified "lean" mixture and also with a homogeneous mixture, complex interaction is required between the injection nozzle, the geometry of the combustion chamber, the location of the ignition spark and the flow of the gas introduced into the combustion chamber. As a result of realizing different forms of combustion, internal combustion engines with direct injection may more efficiently utilize fuel. A motor vehicle operated using an internal combustion engine with direct injection therefore may exhibit lower fuel consumption than a motor vehicle with a corresponding internal combustion engine with intake pipe injection.

At the transition between the different forms of combustion that may be realized by a direct injection device, provision may be made to ensure the stability of the combustion. Furthermore, different forms of combustion may keep the particle formation in the exhaust gas adequately low both with regard to soot mass and soot particle count such that no particle filter may be used in order to adhere to the applicable exhaust-gas regulations. For this purpose, it is known to provide not only the injection system for the direct injection into the combustion chamber but also a further injection system for an intake pipe injection. A combination of intake pipe injection and direct injection may make it possible to ensure both the stability of the combustion and also an adequate suppression of the soot formation in the exhaust gas. Owing to the plurality of injection systems, however, such a combination of intake pipe injection and direct injection may involve considerable outlay.

It is also known, in order to reduce fuel consumption in the part-load range, for individual cylinders to not be utilized for power generation (selective cylinder deactivation). U.S. 2005/0011485 A1 describes a heavy-duty engine in which, at low load, cylinders can be selectively deactivated. To avoid pumping losses, the inlet valve and the outlet valve of a deactivated cylinder remain closed. This does not permit an adequate reduction of soot formation with simultaneously efficient fuel utilization in different load ranges.

The inventors herein recognize the abovementioned disadvantages and disclose a system and method for the reduction of pumping losses and soot formation with selective cylinder deactivation. A four-stroke internal combustion engine which is operated or controlled in accordance with the disclosure has a multiplicity of cylinders, a fuel direct injection device and a selective cylinder deactivation device. The internal combustion engine is in particular an applied-ignition engine. The internal combustion engine has an injection system which, for each cylinder, comprises at least one injection nozzle for the direct injection of fuel into the combustion chamber of the respective cylinder. The injection system may furthermore comprise one or more injection pumps and corresponding lines and a controller for the control of the injection valves and of the pump or pumps. The internal combustion engine furthermore has a selective cylinder deactivation device, and it is thus possible for one or more cylinders to not be utilized for power generation in the part-load range; the fuel consumption of the internal combustion engine in the part-load range can thus be reduced. It is in particular the case that the injection system is correspondingly designed for realizing the selective cylinder deactivation.

According to the disclosure, in a load transition range of the internal combustion engine, during a compression stroke of a first cylinder which is not utilized for power generation, that is to say which is "deactivated", fuel is injected into a combustion chamber of the first cylinder. The load transition range is in particular a medium-load range which is passed through upon the transition from a part-load range to a full-load range of the internal combustion engine or, conversely, from a full-load range to a part-load range of the internal combustion engine. The injection of fuel takes place in particular during a time period which is short in relation to the duration of the compression stroke, that is to say in relation to the duration of the upward movement of the piston, and said injection of fuel may for example take the form of a main injection or be similar to a main injection of an injection process broken down into multiple partial injections.

Furthermore, according to the disclosure, an inlet valve of the first cylinder is open during the compression stroke in order to make the fuel-air mixture produced by the fuel injection available to a second cylinder, which is utilized for power generation and which is thus not deactivated, for the intake or charge of the combustion chamber of the second cylinder. For this purpose, the inlet valve is open for a period of time which is at least partially subsequent to the fuel injection. The mixture produced by the fuel injection, in particular a fuel-air mixture composed of the air supplied into the combustion chamber and the fuel injected into said combustion chamber, can therefore pass into an intake tract of the internal combustion engine and out of said intake tract into the second cylinder which is utilized for power generation. Within the context of the present disclosure, "intake tract" refers to a region of the internal combustion engine from which the second cylinder is filled with gas, in particular an intake manifold or an intake pipe of the second cylinder. In the case of a supercharged engine, the intake tract may be at elevated pressure, and if an exhaust-gas recirculation system is provided, it may also be possible for a mixture of air and recirculated exhaust gas to be available in the intake tract for the charging of the cylinders. The first cylinder may also be charged from the intake tract. As a result of the compression movement of the piston of the first cylinder, the mixture is forced out of the combustion chamber of the first cylinder into the intake tract and onward into the combustion chamber of the second cylinder. Here, the second cylinder may be operated in the normal mode and thereby contributes to the generation of the mechanical power of the internal combustion engine and to the drive of the first cylinder which is not utilized for power generation. Since the first cylinder is deactivated, the mixture produced in the first cylinder is not ignited, and it is preferably the case that no further injection takes place during the compression stroke after the closing of the inlet valve. The internal combustion engine may comprise further cylinders which can be deactivated or utilized for power generation.

By virtue of the fact that, during a compression stroke of a cylinder which is not utilized for power generation, an injection of fuel takes place into a combustion chamber of the cylinder and an inlet valve of the cylinder is open for the purpose of making the mixture produced therein available to a further cylinder which is utilized for power generation and which is in particular operated in the normal mode, it is made possible for an already substantially homogeneous mixture to be introduced into the second cylinder, into which mixture a further injection of fuel may take place if appropriate. In this way, it is possible both for the stability of the combustion to be increased and also for the soot generation to be reduced, without an intake pipe injection device having a dedicated injection valve or injection system. In this way, it is made possible in a simple manner to increase the quality of the combustion and in particular the exhaust-gas quality, while realizing efficient fuel utilization. According to the disclosure, therefore, selective cylinder deactivation and variable inlet valve actuation are combined with one another to attain the advantages of selective cylinder deactivation with regard to fuel consumption but also to permit the operation of the non-deactivated cylinders with reduced soot formation.

A system is disclosed for a four-stroke internal combustion engine comprising: at least two cylinders; a fuel direct injection device; a variable valve timing system; an engine controller to control valve timing according to load; wherein, below a lower load threshold, a first cylinder is deactivated, an injection of fuel takes place into a combustion chamber of the first cylinder and an inlet valve of the first cylinder is open during a compression stroke. The opening of the inlet valve during a compression stroke of the first cylinder when deactivated allows the substantially homogenous air-fuel mixture therein to escape into the intake manifold and be made available to the second and active cylinder.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure. Further, the inventors herein have recognized the disadvantages noted herein, and do not admit them as known.

BRIEF DESCRIPTION OF THE DRAWINGS

FIG. 4 shows, in table form, the function of the valves and the injections of a four-stroke four cylinder engine in a selective cylinder deactivation mode.

DETAILED DESCRIPTION

An internal combustion engine according to the present disclosure may comprise an even number of cylinders, for example four cylinders. In the load transition range, every second cylinder, for example each odd-numbered cylinder in terms of the arrangement or the ignition sequence, is not utilized for power generation. During a compression stroke of the respective odd-numbered cylinder, an injection of fuel takes place into a combustion chamber of the cylinder and an inlet valve of the cylinder is open for the purpose of making the mixture available to a further cylinder which is utilized for power generation, in particular a cylinder which follows the respective cylinder. In the example of a four cylinder engine, an intake stroke of a second cylinder takes place at the same time as a compression stroke of a first cylinder and the mixture that is produced in the first cylinder, which is deactivated, during the compression stroke may be utilized substantially completely for the charging of the combustion chamber of a second cylinder during the intake stroke of the second cylinder. The second cylinder may be operated in the normal mode and is thus utilized for power generation. It should be appreciated that the combined differential cylinder operation described herein occurs with overall positive engine output torque, such that the cylinders are not providing engine braking, such as so-called Jake brake operation.

Figure 1:
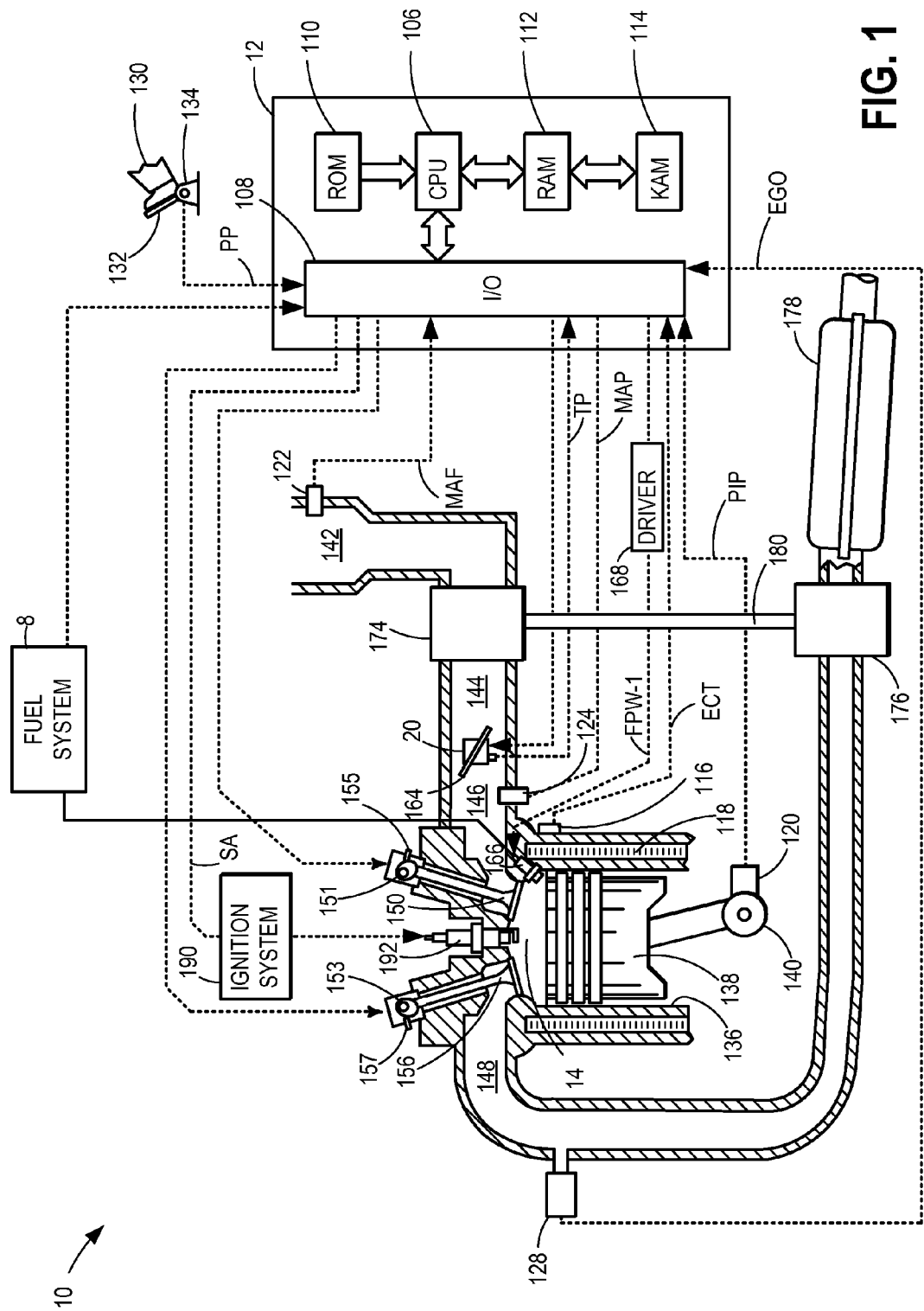
FIG. 1 shows an example cylinder of an internal combustion engine in accordance with the present disclosure.
Figure 2:
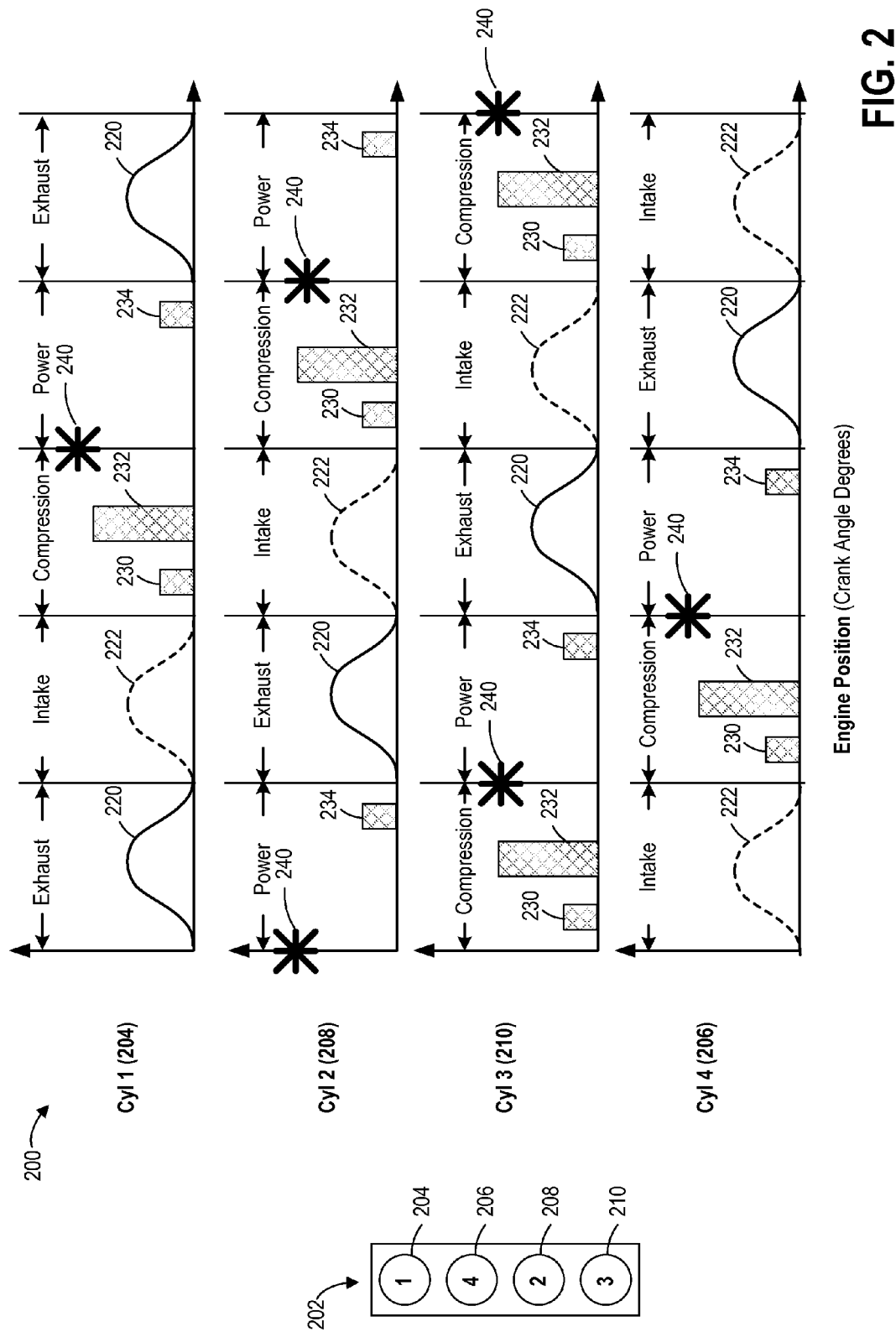
FIG. 2 shows, the function of the valves and the injections of a four-stroke four cylinder engine in a normal mode.
Figure 3:
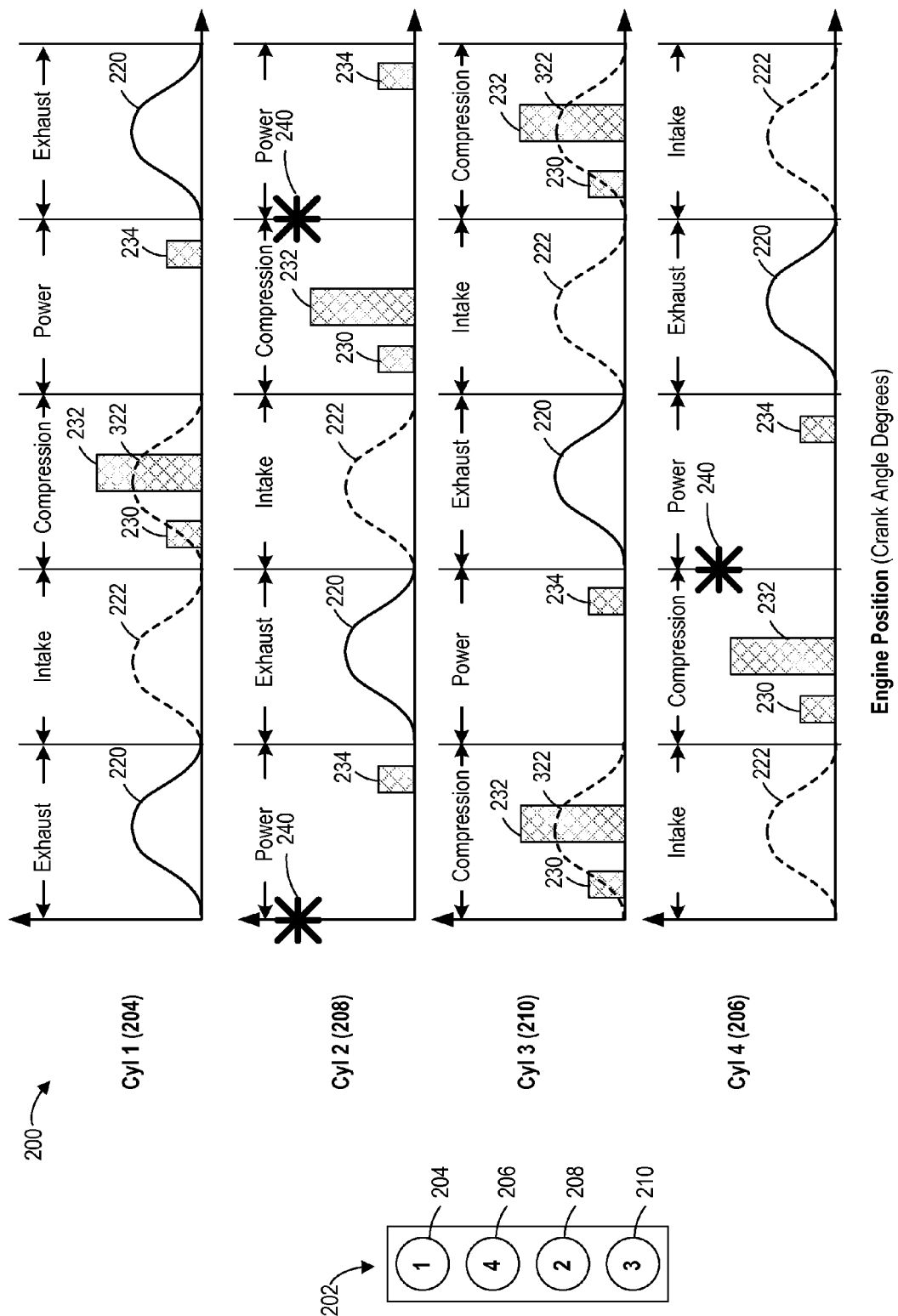
FIG. 3 shows, the function of the valves and the injections of a four-stroke four cylinder engine in a selective cylinder deactivation mode.
Figure 5:
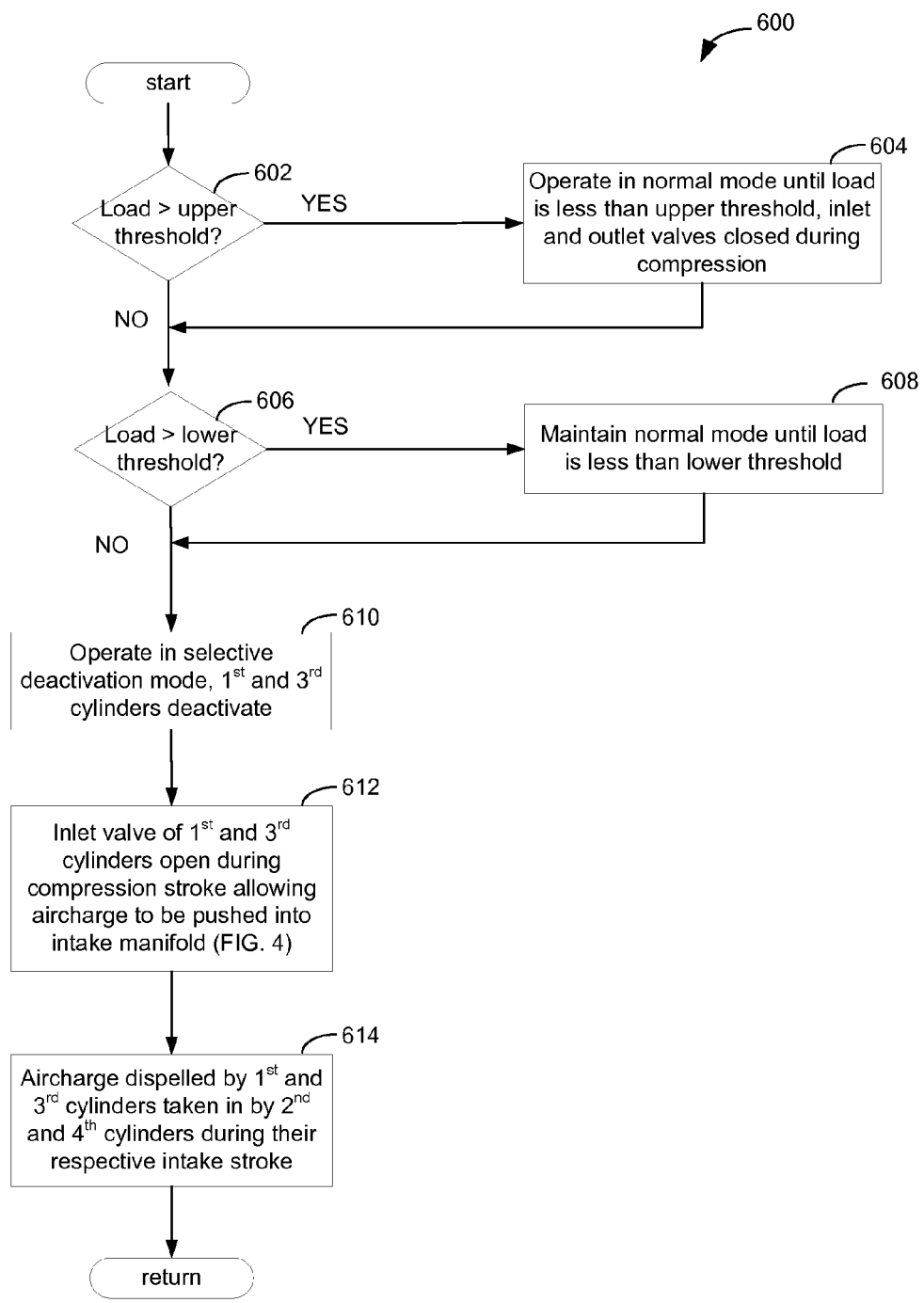
FIG. 5 shows a flowchart of a method in accordance with the present disclosure.

The method and systems of the present disclosure will be described in greater detail below in reference to the figures. FIG. 1 shows a schematic depiction of an engine. FIG. 2 shows the valve timing and fuel injection scheme for an engine in accordance with the disclosure in the normal mode, when four cylinders are active. FIG. 3 shows the valve timing and fuel injection scheme for an engine in accordance with the present disclosure in a selective cylinder deactivation mode where cylinder 1 and 3 are not utilized for power supply. FIG. 4 tabulates the valve and injection timing in a selective cylinder deactivation mode. FIG. 5 is a flow chart diagramming a method of the present disclosure.

FIG. 1 depicts an example embodiment of a combustion chamber or cylinder of internal combustion engine 10. Engine 10 may receive control parameters from a control system including controller 12 and input from a vehicle operator 130 via an input device 132. In this example, input device 132 includes an accelerator pedal and a pedal position sensor 134 for generating a proportional pedal position signal PP. Cylinder (herein also "combustion chamber") 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel to enable a starting operation of engine 10.

Cylinder 14 can receive intake air via a series of intake air passages 142, 144, and 146. Intake air passage 146 may communicate with other cylinders of engine 10 in addition to cylinder 14. In some embodiments, one or more of the intake passages may include a boosting device such as a turbocharger or a supercharger. For example, FIG. 1 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 20 including a throttle plate 164 may be provided along an intake passage of the engine for varying the flow rate and/or pressure of intake air provided to the engine cylinders. For example, throttle 20 may be disposed downstream of compressor 174 as shown in FIG. 1, or alternatively may be provided upstream of compressor 174.

Exhaust passage 148 may receive exhaust gases from other cylinders of engine 10 in addition to cylinder 14. Exhaust gas sensor 128 is shown coupled to exhaust passage 148 upstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof.

It may advantageously be provided that a post-injection of the fuel into the combustion chamber of the first cylinder takes place during an expansion stroke, following the compression stroke of the first cylinder. Said post-injection may, for example, serve for the enrichment of the exhaust gas with fuel in order to improve the operation of an exhaust-gas aftertreatment system.

Exhaust temperature may be measured by one or more temperature sensors (not shown) located in exhaust passage 148. Alternatively, exhaust temperature may be inferred based on engine operating conditions such as speed, load, air-fuel ratio (AFR), spark retard, etc. Further, exhaust temperature may be computed by one or more exhaust gas sensors 128. It may be appreciated that the exhaust gas temperature may alternatively be estimated by any combination of temperature estimation methods listed herein.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some embodiments, each cylinder of engine 10, including cylinder 14, may include at least two intake poppet valves and at least two exhaust poppet valves located at an upper region of the cylinder.

Intake valve 150 may be controlled by controller 12 by cam actuation via cam actuation system 151. Similarly, exhaust valve 156 may be controlled by controller 12 via cam actuation system 153. Cam actuation systems 151 and 153 may each include one or more cams and may utilize one or more of cam profile switching (CPS), variable cam timing (VCT), variable valve timing (VVT) and/or variable valve lift (VVL) systems that may be operated by controller 12 to vary valve operation. The operation of intake valve 150 and exhaust valve 156 may be determined by valve position sensors (not shown) and/or camshaft position sensors 155 and 157, respectively. In alternative embodiments, the intake and/or exhaust valve may be controlled by electric valve actuation. For example, cylinder 14 may alternatively include an intake valve controlled via electric valve actuation and an exhaust valve controlled via cam actuation including CPS and/or VCT systems. In still other embodiments, the intake and exhaust valves may be controlled by a common valve actuator or actuation system, or a variable valve timing actuator or actuation system. A cam timing may be adjusted (by advancing or retarding the VCT system) to adjust an engine dilution in coordination with an EGR flow thereby reducing EGR transients and improving engine performance.

Cylinder 14 can have a compression ratio, which is the ratio of volumes when piston 138 is at bottom center to top center. Conventionally, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some embodiments, each cylinder of engine 10 may include a spark plug 192 for initiating combustion. Ignition system 190 can provide an ignition spark to combustion chamber 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

As a non-limiting example, cylinder 14 is shown including one fuel injector 166. Fuel injector 166 is shown coupled directly to cylinder 14 for injecting fuel directly therein in proportion to the pulse width of signal FPW received from controller 12 via electronic driver 168. In this manner, fuel injector 166 provides what is known as direct injection (hereafter also referred to as "DI") of fuel into combustion cylinder 14. While FIG. 1 shows injector 166 as a side injector, it may also be located overhead of the piston, such as near the position of spark plug 192. Fuel may be delivered to fuel injector 166 from a high pressure fuel system 8 including fuel tanks, fuel pumps, and a fuel rail. Alternatively, fuel may be delivered by a single stage fuel pump at lower pressure, in which case the timing of the direct fuel injection may be more limited during the compression stroke than if a high pressure fuel system is used. Further, while not shown, the fuel tanks may have a pressure transducer providing a signal to controller 12. It will be appreciated that, in an alternate embodiment, injector 166 may be a port injector providing fuel into the intake port upstream of cylinder 14.

As described above, FIG. 1 shows one cylinder of a multi-cylinder engine. As such each cylinder may similarly include its own set of intake/exhaust valves, fuel injector(s), spark plug, etc.

While not shown, it will be appreciated that engine may further include one or more exhaust gas recirculation passages for diverting at least a portion of exhaust gas from the engine exhaust to the engine intake. As such, by recirculating some exhaust gas, an engine dilution may be affected which may reduce engine knock, peak cylinder combustion temperatures and pressures, throttling losses, and NOx emissions. The one or more EGR passages may include an LP-EGR passage coupled between the engine intake upstream of the turbocharger compressor and the engine exhaust downstream of the turbine, and configured to provide low pressure (LP) EGR. The one or more EGR passages may further include an HP-EGR passage coupled between the engine intake downstream of the compressor and the engine exhaust upstream of the turbine, and configured to provide high pressure (HP) EGR. In one example, an HP-EGR flow may be provided under conditions such as the absence of boost provided by the turbocharger, while an LP-EGR flow may be provided during conditions such as in the presence of turbocharger boost and/or when an exhaust gas temperature is above a threshold. The LP-EGR flow through the LP-EGR passage may be adjusted via an LP-EGR valve while the HP-EGR flow through the HP-EGR passage may be adjusted via an HP-EGR valve (not shown).

Controller 12 is shown in FIG. 1 as a microcomputer, including microprocessor unit 106, input/output ports 108, an electronic storage medium for executable programs and calibration values shown as read-only memory chip 110 in this particular example, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; and manifold absolute pressure signal (MAP) from sensor 124. Engine speed signal, RPM, may be generated by controller 12 from signal PIP. Manifold pressure signal MAP from a manifold pressure sensor may be used to provide an indication of vacuum, or pressure, in the intake manifold. Still other sensors may include fuel level sensors and fuel composition sensors coupled to the fuel tank(s) of the fuel system.

Storage medium read-only memory 110 can be programmed with computer readable data representing instructions executable by processor 106 for performing the methods described below as well as other variants that are anticipated but not specifically listed.

The example cylinder of engine 10 may be one cylinder of a four cylinder engine. For example, a four-stroke internal combustion engine, in particular in an applied-ignition engine, wherein during a first stroke, air or an ignitable mixture of fuel and air is inducted into the combustion chamber of a first cylinder (cylinder 1). In particular in the case of an engine equipped with a turbocharger or a supercharger, the combustion chamber is filled with air or with the fuel-air mixture under pressure; this, too, is referred to here as "induction". In the case of an internal combustion engine with exhaust-gas recirculation, the supplied air may also contain an exhaust-gas fraction. As shown in FIG. 2, for a reciprocating piston engine on the basis of the movement direction of the piston in an exemplary cylinder arrangement, the induction in the first stroke of the first cylinder takes place during a downward movement of the piston.

In the compression stroke which follows the intake stroke, the inducted mixture or the inducted air is compressed by an upward movement of the piston. In the case of an applied-ignition engine, the ignition is performed by an ignition spark when the piston is in the vicinity of the top dead center. The ignited mixture forces the piston downward during the expansion stroke. In the expansion stroke, work is done which serves for the power generation of the engine. During the exhaust stroke which follows the expansion stroke, the burned mixture is discharged into the exhaust system by an upward movement of the piston.

In the case of a four cylinder engine, the individual strokes and piston movements are offset from one cylinder to the next in each case. The chronological sequence of the four strokes of the four cylinders of a four cylinder four-stroke engine is specified in FIG. 2 where, the chronological sequence of the individual strokes of the second cylinder (cylinder 2) is offset in relation to that of the first cylinder (cylinder 1) such that the intake stroke of the second cylinder takes place at the same time as the compression stroke of the first cylinder. Likewise, the intake stroke of the cylinder 3 takes place at the same time as the compression stroke of the cylinder 2, the intake stroke of the cylinder 4 takes place at the same time as the compression stroke of the cylinder 3 and the intake stroke of the cylinder 1 takes place at the same time as the compression stroke of the cylinder 4. The other strokes are offset with respect to one another correspondingly, such that for example at all times, one cylinder is in the expansion stroke in which said cylinder outputs work and drives the other cylinders and the drivetrain. In the FIGS. 2 and 3, the cylinders 1 to 4 are presented in the ignition sequence; the geometric arrangement of the cylinders within the engine may be different.

Turning to FIG. 2, an example map of the valve timing and fuel injections for a four cylinder engine are shown. Here, for each cylinder, the normal mode is presented, in which the cylinder is utilized for power generation and is thus not deactivated. In the example illustrated, each cylinder has an inlet valve and an outlet valve, wherein the provision of a single inlet valve and a single outlet valve per cylinder is generally sufficient. The fuel injection is broken down into a pre-injection (pilot injection), a main injection and a post-injection; the main injection in particular may be divided into a plurality of further partial injections. During the intake stroke, the inlet valve of each cylinder is open and the outlet valve is closed; an injection of fuel does not take place. During the compression stroke, both valves are closed, wherein the pilot and the main injection take place. During the expansion stroke, both valves remain closed; a post-injection may take place here. Finally, in the exhaust stroke, the inlet valve remains closed while the outlet valve is opened in order to discharge the exhaust gas into the exhaust tract of the internal combustion engine; an injection of fuel does not take place in the exhaust stroke.

FIG. 2 shows a graph 200 of example valve timing and piston position with respect to an engine position (crank angle degrees) within the four strokes (intake, compression, power and exhaust) of the engine cycle for four cylinder engine 202 with a firing order of 1-2-3-4 (e.g., 204, 208, 210, 206, respectively). During operation, piston 36 gradually moves downward from top-dead-center (TDC), bottoming out at bottom-dead-center (BDC) by the end of the intake stroke. The piston then returns to the top, at TDC, by the end of the compression stroke and then again moves back down, towards BDC, during the power stroke (herein also referred to as expansion stroke), returning to its original top position at TDC by the end of the exhaust stroke. Curves 220 and 222 depict valve lift profiles during normal engine operation for exhaust and intake valves, respectively. An exhaust valve may be opened just as the piston bottoms out at the end of the power stroke. The exhaust valve may then close as the piston completes the exhaust stroke, and remain open at least until a subsequent intake stroke of the following cycle has commenced. In the same way, an intake valve may be opened at or before the start of an intake stroke, and may remain open at least until a subsequent compression stroke has commenced.

During the normal operating mode shown in FIG. 2, each cylinder is utilized for power generation and is thus not deactivated in the manner described in greater detail below. In this mode, fuel injection is broken down into a pre-injection (or pilot injection), a main injection and a post-injection; and in some embodiments, the main injection may be divided into a plurality of further partial injections. During the intake stroke, the inlet valve of each cylinder is open and the outlet valve is closed; an injection of fuel does not take place. During the compression stroke, both valves are closed, wherein the pre-injection and the main injection take place. During the expansion stroke, both valves remain closed; a post-injection may take place here. Finally, in the exhaust stroke, the inlet valve remains closed while the outlet valve is opened in order to discharge the exhaust gas into the exhaust tract of the internal combustion engine; during normal engine operations, an injection of fuel does not take place during the exhaust stroke.

As shown in FIG. 2, normal engine operation includes operating the cylinders with a main injection 232 during the compression stroke. Furthermore, the injection process may comprise partial injections in addition to the main injection, wherein the fuel amount supplied during the one or more partial injections is considerably smaller than that supplied during the main injection. Therefore, during every stroke of the engine, a pre-injection 230, main injection 232 and post-injection 234 takes place within the cylinders. As such, the individual injections to the various cylinders do not overlap, and there remains sufficient time available for the opening and closing of the injection valves and for the supply of highly pressurized fuel to the injection valves. During the compression stroke which follows the intake stroke, the inducted air-fuel mixture or the inducted air is compressed by an upward movement of the piston. In the case of an applied-ignition engine, ignition event 240 is performed by means of an ignition spark when the piston is in the vicinity of the top dead center. The ignited mixture forces the piston downward during the expansion stroke, which is also referred to herein as the power stroke. During the power stroke, work is done that generates power within the engine. Subsequently, the exhaust stroke follows the expansion stroke or working stroke, and serves to discharge the burned mixture into the exhaust system by an upward movement of the piston. Thereby, during normal engine operation, each cylinder generates power during the working stroke of the cylinder, which is the expansion or power stroke. In some instances, the normal operating mode is referred to as an engine powering mode since each cylinder of the engine performs work that generates power during the engine drive cycle.

In the case of a four-cylinder engine, the individual strokes and piston movements are offset from one cylinder to the next in each case. The chronological sequence of the four strokes of the four cylinders of a four-cylinder four-stroke engine is illustrated in FIG. 2. Here, the chronological sequence of the individual strokes of the second cylinder (cylinder 2) is offset in relation to that of the first cylinder (cylinder 1) such that the intake stroke of the second cylinder takes place during the compression stroke of the first cylinder. Likewise, the intake stroke of the cylinder 3 takes place during the compression stroke of the cylinder 2, the intake stroke of cylinder 4 takes place during the compression stroke of cylinder 3, and the intake stroke of cylinder 1 takes place during the compression stroke of cylinder 4. In this way, the other strokes are offset with respect to one another correspondingly, such that one cylinder is in the expansion stroke in which said cylinder outputs work and drives the other cylinders and the drivetrain. In FIG. 2, cylinders 1 to 4 are presented in the 1-2-3-4 ignition sequence. However, the geometric arrangement of the cylinders within the engine may be different.

Turning now to FIG. 3, an example map of valve timing and injection timing for a selective cylinder deactivation mode is shown. Cylinders 2 (208) and 4 (206) are still active, in that they produce power to rotate crankshaft 140. In a selective cylinder deactivation mode, for example under low load conditions, cylinders 1 (204) and 3 (210), the odd-numbered cylinder, may be deactivated. Deactivation may comprise discontinuing spark ignition. For example spark ignition indicated at 240 for cylinders 2 and 4 has been disabled in the odd-numbered cylinders. In the deactivated cylinders, the inlet valve is opened, at least for a duration of the compression stroke. This allows an aircharge therein to be delivered into the intake manifold and subsequently taken in to the adjacent, active cylinders. Closure of the intake valve of the active cylinders is maintained.

The cylinders may also be referred to a first and a second cylinder. The first and second cylinders refer to an adjacent pair in a firing order. An engine in accordance with the present disclosure may comprise any even number of cylinders such as 6, 8, 10, or 12 for example and the first and the second cylinder may be repeated accordingly. For example, in a four cylinder engine the first cylinder comprises a first and a third cylinder in a firing order and a second cylinder comprises a second and fourth cylinder, such that first and the second cylinders are repeated twice in a four cylinder engine.

Fuel injection may occur with the same timing as shown in FIG. 2, where pilot injection 230 and main injection 232 occur during a compression stroke. However, in the disabled cylinders, fuel injection volume may be altered. Furthermore, the intake valve of the disabled cylinder is open during the compression stroke, shown at 322. In this way, fuel that has been directly injected into the deactivated cylinder may mix with air therein and during a compression stroke may exit the combustion chamber and enter the intake manifold. Air-fuel mixture that has been forced into the intake manifold may be nearly homogenous as it has become mixed within the combustion chamber and transition into the intake manifold. This homogenous aircharge may then be taken into the combustion chamber of an adjacent cylinder in the firing order during a subsequent intake stroke. This may allow for the intake of a substantially homogenous aircharge in the absence of a port fuel injector (herein also referred to as an intake pipe injector).

Because the fuel injected into the deactivated cylinders is taken up by the still active cylinders fuel injection quantity may be adjusted. For example, the total quantity of fuel injected into the deactivated cylinder may be less than if the cylinder were in an active state. Concurrently, a quantity of fuel injected into the active cylinders may be decreased as they receive the homogenous aircharge containing fuel from the intake manifold. In this way, decreasing a quantity of fuel injected into even-number cylinders concomitant with a quantity of fuel taken up from the intake manifold a total fuel quantity in the active cylinders may be controlled. In some embodiments further modifications to individual fuel injections may vary. For example, a pilot injection may be reduced concomitant with the quantity of fuel taken up from the intake manifold, while a main injection may remain substantially the same. In another embodiment, fuel may be supplied to the disabled cylinder in a quantity such that no fuel will be injected into the active, even-numbered cylinder and the cylinder is substantially solely supplied with fuel by the deactivated, first cylinder.

Turning now to FIG. 4, the valve timing of cylinders during a selective deactivation mode is shown in a table form. As presented in the upper table in FIG. 4, in the control of the valves according to the disclosure. In contrast to the normal mode, during a selective deactivation mode the inlet valve of the first cylinder is at least temporarily open during the compression stroke (printed in bold in the upper table of FIG. 4). As specified in the lower table of FIG. 4, the pre-injection of fuel and the main injection of fuel into the combustion chamber of the cylinder take place during the compression stroke of the first cylinder as in normal operation; it is however possible, for example, for the injection time, duration and amount to be adapted according to the requirements for the charging of the second (active) cylinder via the intake tract. In the other strokes, the valve positions are the same as in normal operation. A post-injection of fuel may, if appropriate, take place during the expansion stroke. Here, the cylinder 1 may thus not be utilized for power generation and, in this sense, is deactivated. Furthermore, the third cylinder is also inactive in the selective cylinder deactivation mode of the example four cylinder engine. The third cylinder may also have an inlet valve at least temporarily open during the compression stroke allowing the fuel-air mixture therein to re-enter the intake manifold and thusly be taken in to the fourth cylinder which is active for the purpose of powering a vehicle.

As presented by way of example in FIG. 4, it is possible in particular for two cylinders of the four cylinder engine, cylinders 1 and 3 in the example, to be operated in the stated manner. Said cylinders do not contribute to the power generation of the engine. The other cylinders, cylinders 2 and 4 in the example, are operated in the normal mode and thus generate the power that can be extracted from the engine and which is also required for driving the two deactivated cylinders. As can be seen in FIG. 4, in the described arrangement of deactivated and non-deactivated cylinders, the intake stroke of cylinder 2 takes place at the same time as the compression stroke of the first cylinder, and the intake stroke of cylinder 4 takes place at the same time as the compression stroke of cylinder 3. During the intake stroke, the respective inlet valve of cylinder 2 or 4 is open, such that direct charging of cylinder 2 or 4 takes place with the fuel-air mixture discharged into an intake tract of the internal combustion engine through the open inlet valve during the compression stroke of cylinder 1 or 3. The injection into the non-deactivated cylinders 2 and 4 takes place, in principle, as in the normal mode; it is however possible, for example, for the injection time, duration and amount to be changed in relation to the normal mode, because the combustion chamber is now already filled with a fuel-air mixture.

In an embodiment of the disclosure, the inlet valve of the first cylinder may be open during an opening time of an inlet valve of the second cylinder during an intake stroke of the second cylinder. It is possible in particular for the mixture to be sucked into the combustion chamber by a downward movement of the piston of the second cylinder. In this way, the mixture produced in the combustion chamber of the first cylinder may pass rapidly and substantially without losses into the combustion chamber of the second cylinder. It may be, for example, possible to substantially prevent deposition of fuel in the intake tract.

The inlet valve of the first cylinder may be open at least for the entire duration of the compression stroke subsequent to the injection. In another embodiment, the inlet valve may be open for at least half of the total time duration of the compression stroke. For example, the inlet valve may remain open from the intake stroke. In another example, after a closure of the inlet valve at the end of the intake stroke, the inlet valve may be re-opened before or at the same time as the injection, in particular a main injection of an injection process which is broken down into a plurality of partial injections. The mixture produced in the combustion chamber of the first cylinder may be made available to the second cylinder in this way.

Turning now to FIG. 5, a flow chart diagramming a method in accordance with the present disclosure is shown. A method in accordance with the present disclosure may be carried out by engine controller 12 as stored in read-only memory 110. The engine controller 12 may furthermore be suited to control spark ignition via ignition system 190 and valve timing via cam actuation system 151 (shown in FIG. 1) in accordance with the method of the present disclosure. The method 600 starts and proceeds to 602 where it is determined if the load is greater than an upper threshold. If the load is above an upper load threshold (YES), the method proceeds to 604 where the engine is operated in the normal mode until the load is less than an upper threshold. If at 602 the load is not greater than the upper threshold (NO) the method proceeds to 606 where it is determined if the load is greater than a lower threshold.

If at 606, the load is greater than a lower threshold (YES) the method proceeds to 608 where the normal mode is maintained until the load falls below the lower threshold. If at 606, the load is below the lower threshold (NO) the method proceeds to step 610.

At 610, the selective deactivation mode is enabled. In a four cylinder engine the $1^{st}$ and $3^{rd}$ cylinders in a firing order may be deactivated. Deactivation of the cylinders may entail discontinuing spark ignition in the example of an applied ignition engine. It should be appreciated the upper and lower threshold may be the same threshold, or the values may differ based on the displacement, compression ratio, power output and other parameters of the cylinders.

At 612, while the engine is in a selective deactivation mode, the inlet valve of the $1^{st}$ and $3^{rd}$ cylinders are open for, at least a partial duration of the compression stroke. This opening of the inlet valve during the compression stroke allows the air fuel mixture in the $1^{st}$ and $3^{rd}$, deactivated cylinders to be pushed into the intake manifold as the piston moves up within the cylinder. At 614, during the intake stroke of the $2^{nd}$ and $4^{th}$ cylinders in the firing order, the aircharge dispelled into the intake manifold from the $1^{st}$ and $3^{rd}$ cylinders is taken into the active cylinders which are operated with the same valve timing as a normal mode and undergo combustion to provide power to the vehicle. The method then returns.

It may thus be provided that, in a low load range, the first cylinder (or first and third cylinder in a four cylinder engine) is deactivated and the second cylinder (or second and fourth cylinder in a four cylinder engine) is operated in the normal mode, whereas in the full-load range, the first and the second cylinder are operated in the normal mode. A reduction in fuel consumption and exhaust-gas emissions can hereby be attained in particular in all load ranges.

A device according to the disclosure for controlling a four-stroke internal combustion engine comprises an actuator for actuating at least one inlet valve of a first cylinder of the four-stroke internal combustion engine and comprises an electronic control unit which is designed to control the actuation of the inlet valve and a fuel injection device of the first cylinder. An electronic control unit may be configured as engine controller 12, and the actuator as cam actuation systems cam actuation system 151 as described above in reference to FIG. 1. The actuator is configured such that, in a load transition range of the internal combustion engine, during a compression stroke of the first cylinder, an injection of fuel takes place into a combustion chamber of the first cylinder and the inlet valve of the first cylinder is open during the compression stroke. Here, the first cylinder is not utilized for power generation. After a closure of the inlet valve, no further injection of fuel in the compression stroke and no ignition may take place. In the case of an applied-ignition engine, the device according to the disclosure is preferably also designed for corresponding control of an ignition system of the internal combustion engine.

The internal combustion engine comprises a second cylinder, wherein during the compression stroke of the first cylinder, the fuel-air mixture produced by the injection passes into the intake system of said second cylinder, from which the intake system the first cylinder may also have been charged with gas, in particular with air, and from which intake system the second cylinder is charged during its intake stroke. The second cylinder is utilized for power generation and, for this purpose, may in particular be operated in the normal mode and with correspondingly adapted injection and ignition parameters. The actuator of the inlet valve may for example be of mechanical, hydraulic or electromagnetic form and can be controlled by the electronic control unit via corresponding lines. The electronic control unit may be part of an electronic engine controller.

The device according to the disclosure is in particular designed for carrying out the above-described method for controlling a four-stroke internal combustion engine and thus for operating a four-stroke internal combustion engine in accordance with a corresponding method.

A system is disclosed for a four-stroke internal combustion engine comprising: at least two cylinders; a fuel direct injection device; a variable valve timing system; an engine controller to control valve timing according to load; wherein, below a lower load threshold, a first cylinder is deactivated, an injection of fuel takes place into a combustion chamber of the first cylinder and an inlet valve of the first cylinder is open during a compression stroke. The opening of the inlet valve during a compression stroke of the first cylinder when deactivated allows the substantially homogenous air-fuel mixture therein to escape into the intake manifold and be made available to the second and active cylinder.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system for a four-stroke internal combustion engine comprising:
   at least two cylinders;
   a fuel direct injection device;
   a variable valve timing system;
   an engine controller to control valve timing according to load;
   wherein,
   below a lower load threshold, a first cylinder is deactivated, an injection of fuel takes place into a combustion chamber of the first cylinder and an inlet valve of the first cylinder is open during a compression stroke.

2. The system as claimed in claim 1, wherein the inlet valve of the first cylinder is open at least temporarily at the same time as an inlet valve of a second cylinder during an intake stroke of the second cylinder.

3. The system as claimed in claim 1, wherein the inlet valve of the first cylinder is open for substantially an entire duration of the compression stroke of the first cylinder.

4. The system as claimed in claim 1, wherein an injection of fuel takes place during an expansion stroke of the first cylinder.

5. The system as claimed in claim 1, wherein the first cylinder is deactivated by discontinuing spark ignition.

6. The system as claimed in claim 1, further comprising a second cylinder which is active, even below a lower load threshold, wherein the inlet valve of the second cylinder is closed during a compression stroke.

7. The system as claim in claim 1, wherein the at least two cylinders comprises four cylinders.

8. The system as claimed in claim 7, wherein the first cylinder comprises a first and a third cylinder in a firing order and a second cylinder comprises a second and fourth cylinder, such that first and the second cylinders are repeated twice in a four cylinder engine.

9. A method for an engine, comprising:
   above an upper load threshold, closing an inlet valve of a first cylinder during a compression stroke;
   below a lower load threshold, deactivating the first cylinder and opening an inlet valve of the first cylinder during a compression stroke; and
   regardless of load, closing the inlet valve of a second cylinder during a compression stroke.

10. The method of claim 9, wherein the lower load threshold and the upper load threshold are the same.

11. The method of claim 9, wherein deactivating the first cylinder comprises discontinuing spark ignition in the first cylinder.

12. The method of claim 9, wherein the first cylinder and the second cylinder repeat so that a four cylinder engine has as the first cylinder the first and third cylinder in a firing order, and as the second cylinder a second and fourth cylinder in the firing order.

13. The method of claim 9, wherein opening the inlet valve of the first cylinder during a compression stroke comprises the inlet valve remaining open after an intake stroke.

14. The method of claim 9, wherein opening the inlet valve of the first cylinder during a compression stroke comprises opening the inlet valve of the first cylinder for the entire compression strokes.

15. The method of claim 9, further comprising injecting fuel into the first cylinder during the compression stroke.

16. The method of claim 9, further comprising injecting fuel into the first cylinder during an expansion stroke.

17. A method for an engine comprising:
    below a lower load threshold, deactivating each odd-numbered cylinder in a firing order of a four cylinder engine;
    injecting fuel into a combustion chamber of the odd-numbered cylinders during a compression stroke; and
    when deactivated, opening an inlet valve of the odd-numbered cylinders during the compression stroke to deliver an air-fuel mixture to an intake manifold.

18. The method of claim 17, further comprising maintaining closure of the inlet valve of each even-numbered cylinder during the compression stroke.

19. The method of claim 17, wherein injecting fuel is by direct injection.

20. The method of claim 17, further comprising decreasing a quantity of fuel injected into even-number cylinders concomitant with a quantity of fuel taken up from the intake manifold.

\* \* \* \* \*